(12) United States Patent
White

(10) Patent No.: US 8,561,596 B2
(45) Date of Patent: Oct. 22, 2013

(54) LOW FUEL ENGINE RESTARTING

(75) Inventor: Jarrod J. White, Sterling Heights, MI (US)

(73) Assignee: GM Global Technology Operations LLC, Dearborn, MI (US)

( * ) Notice: Subject to any disclaimer, the term of this patent is extended or adjusted under 35 U.S.C. 154(b) by 393 days.

(21) Appl. No.: 12/967,290

(22) Filed: Dec. 14, 2010

(65) Prior Publication Data

US 2012/0145132 A1 Jun. 14, 2012

(51) Int. Cl.
*F02M 37/04* (2006.01)

(52) U.S. Cl.
USPC .......... 123/509; 220/562; 220/563; 220/564

(58) Field of Classification Search
USPC ........... 123/495, 509; 220/562, 563, 564; 137/571, 574; 417/423.3
See application file for complete search history.

(56) References Cited

U.S. PATENT DOCUMENTS

| | | | |
|---|---|---|---|
| 3,049,171 A * | 8/1962 | Neuerburg et al. | 137/549 |
| 4,638,836 A * | 1/1987 | Bailey | 137/574 |
| 4,708,170 A * | 11/1987 | Bailey | 137/574 |
| 4,919,103 A | 4/1990 | Ishiguro et al. | |
| 5,058,557 A * | 10/1991 | Frank et al. | 123/509 |
| 5,127,432 A * | 7/1992 | Duhaime et al. | 137/574 |
| 5,647,328 A * | 7/1997 | Fournier et al. | 123/509 |
| 5,647,329 A * | 7/1997 | Bucci et al. | 123/509 |
| 6,408,874 B1 * | 6/2002 | Keller | 137/574 |
| 7,032,575 B2 * | 4/2006 | Sims, Jr. | 123/509 |
| 7,252,075 B2 * | 8/2007 | Firtion et al. | 123/509 |
| 7,316,222 B2 * | 1/2008 | Danjyo et al. | 123/509 |
| 7,389,768 B2 * | 6/2008 | Hayakawa et al. | 123/509 |
| 7,617,814 B2 * | 11/2009 | Leppert | 123/509 |
| 2003/0015536 A1 * | 1/2003 | Tekulve et al. | 220/562 |
| 2008/0169033 A1 * | 7/2008 | Tipton et al. | 137/565.24 |

FOREIGN PATENT DOCUMENTS

DE 102007035421 A1 1/2009
FR 1219976 A 5/1960

* cited by examiner

*Primary Examiner* — Stephen K Cronin
*Assistant Examiner* — Joseph Dallo

(57) ABSTRACT

A fuel system includes a fuel tank, a fill neck through which fuel enters the tank, a fuel pump module located in the fuel tank, and a fuel retention component including a lower surface on which the fuel pump module is supported, first and second walls enclosing the lower surface, and a ramp directed from the fill neck toward the lower surface enclosed by the walls.

3 Claims, 3 Drawing Sheets

LOW FUEL ENGINE RESTARTING

BACKGROUND OF INVENTION

The present invention relates generally to a fuel tank assembly, and more particularly to the fuel pump module and the level of fuel present at the inlet of the module when the tank contains a relatively low volume of fuel.

In some vehicles the vertical distance between the bottom of the vehicle and its flat floor is short, thereby requiring the fuel tank to be long, wide and short. When a fuel tank having this shape contains a low volume of fuel, the fuel spreads over a large portion of the bottom surface of the tank. If the vehicle runs out of fuel, adding a small amount of fuel to a tank having this shape can fail to restart the engine because the spread out fuel is not deep enough to allow the pump to be primed.

A fuel pump module located in the tank requires a specific depth of fuel to prime the pump. If fuel in the tank is not present at the fuel pump module with a sufficient depth, the engine cannot be restarted.

A need exists for a fuel tank assembly that ensures that a volume of about one gallon of fuel in the tank will provide a sufficient depth of fuel at the fuel pump inlet to re-prime the pump and restart the engine, even for long, wide and short tanks.

SUMMARY OF INVENTION

An embodiment contemplates a fuel system that includes a fuel tank, a fill neck through which fuel enters the tank, a fuel pump module located in the fuel tank, and a fuel retention component including a lower surface on which the fuel pump module is supported, first and second walls enclosing the lower surface, and a ramp directed from the fill neck toward the lower surface enclosed by the walls.

The component has walls that retain fluid around the fuel pump module so the vehicle can be restarted with a small amount of fuel, for example, about one gallon. The component allows fuel to travel to the fuel pump module without restriction.

This component holds a level of fuel required for the fuel pump module to re-prime itself and supply the engine with enough fuel to start. The component allows the vehicle to be driven to a refueling station where the fuel tank can be refilled.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
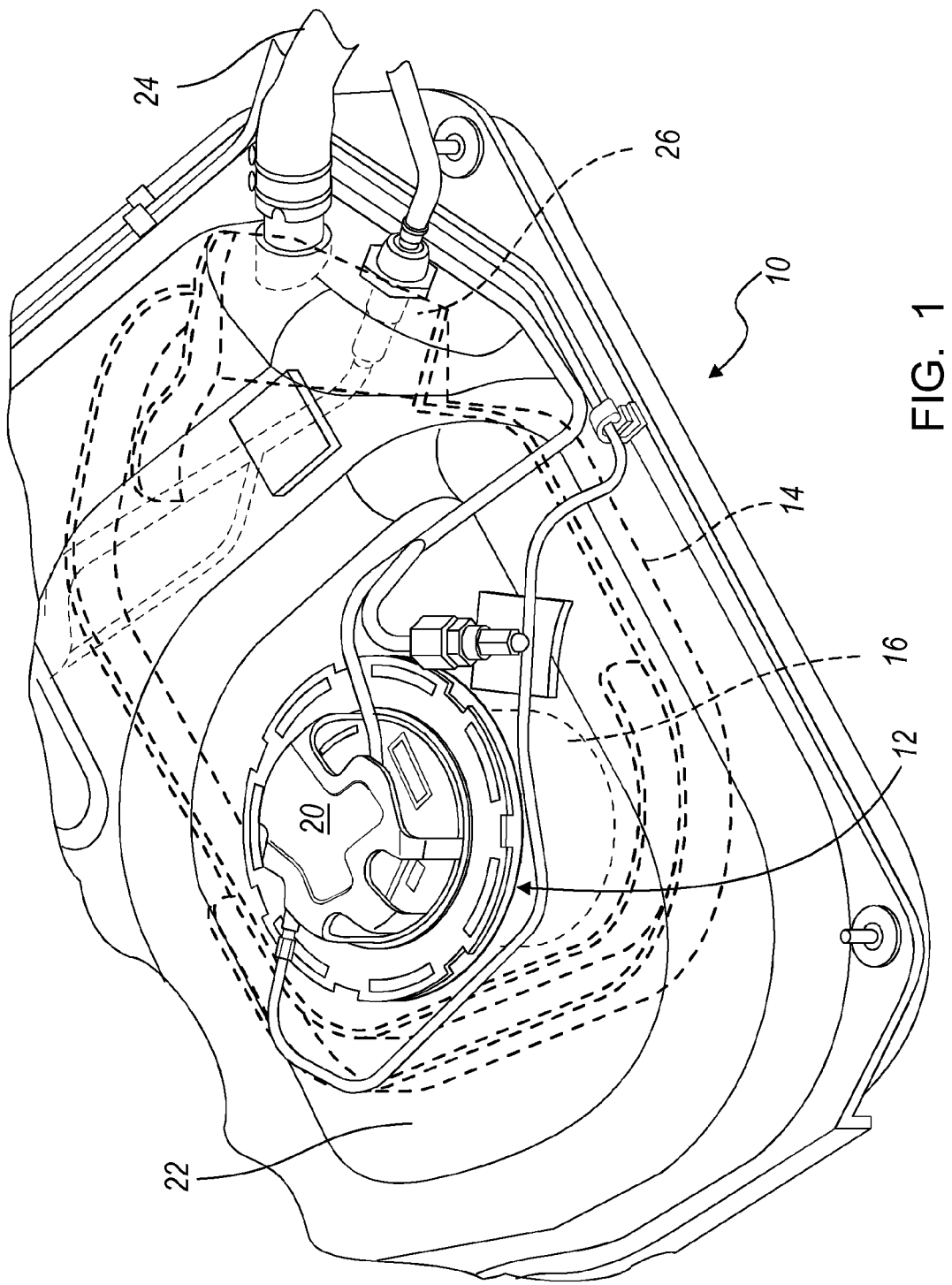
FIG. 1 is a partial top perspective view of a fuel tank showing a fuel retention component located within the tank.
Figure 2:
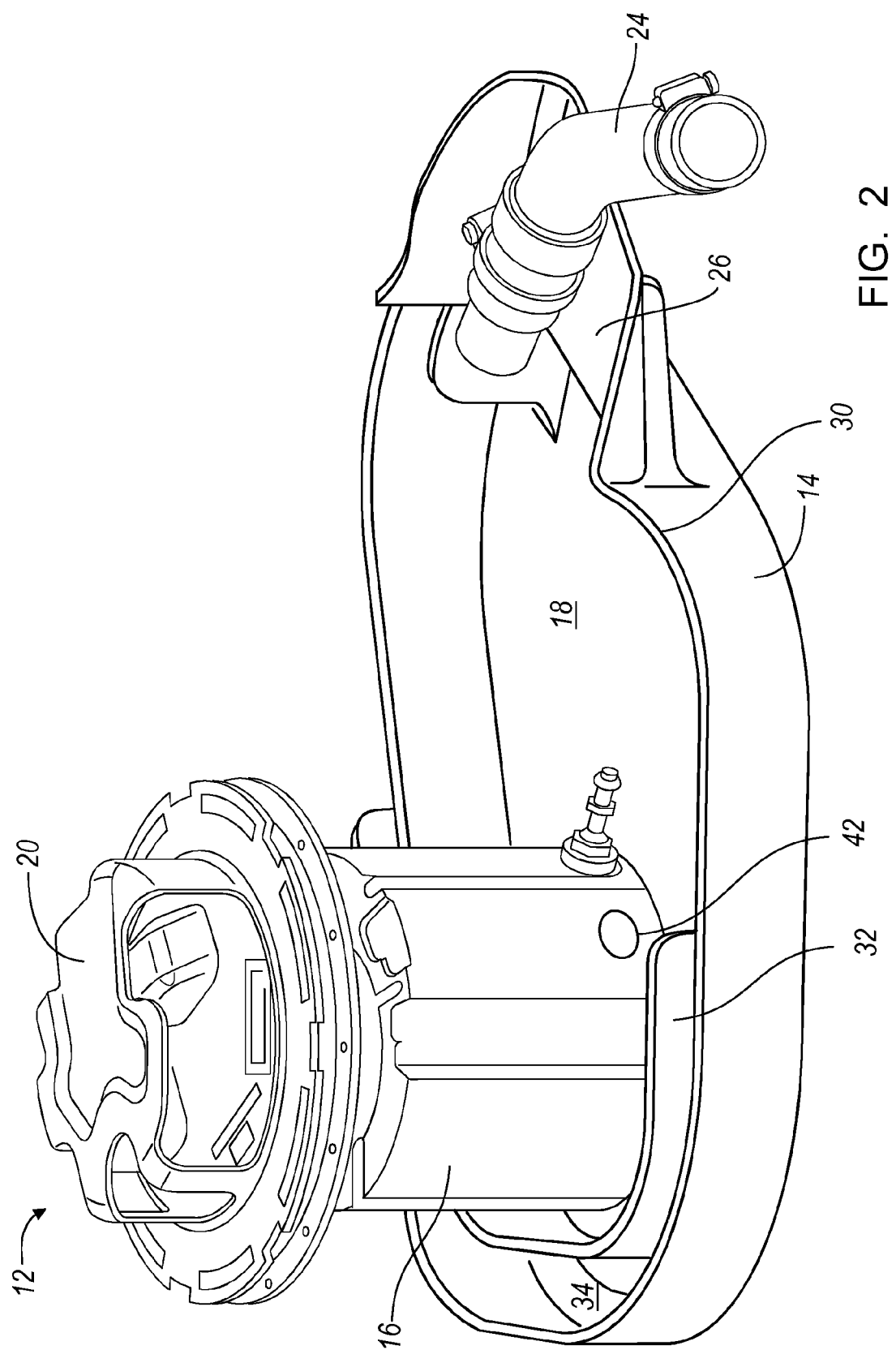
FIG. 2 is side of the view of the fuel retention component and a fuel pump module.

Referring now to the drawings, FIGS. 1 and 2 show a fuel tank 10 (shown only in FIG. 1) for a motor vehicle, a fuel pump module 12 installed in the tank 10, and a fuel retention component 14 located within the tank 10 in its assembled position. The cylindrical portion 16 of the fuel pump module 12 is located above, the lower surface 18 of the fuel retention component 14. A circular top assembly 20 is supported on the upper surface of the tank 10. The lower surface 22 of the tank 10 supports the fuel retention component 14.

During a low-fuel refilling procedure, fuel carried in a fill neck 24 enters the tank 10 and is directed along a duct 26 onto the lower surface 18 of the fuel retention component 14. Preferably duct 26 is inclined downward toward the lower surface 18 of the fuel retention component 14.

Figure 3:
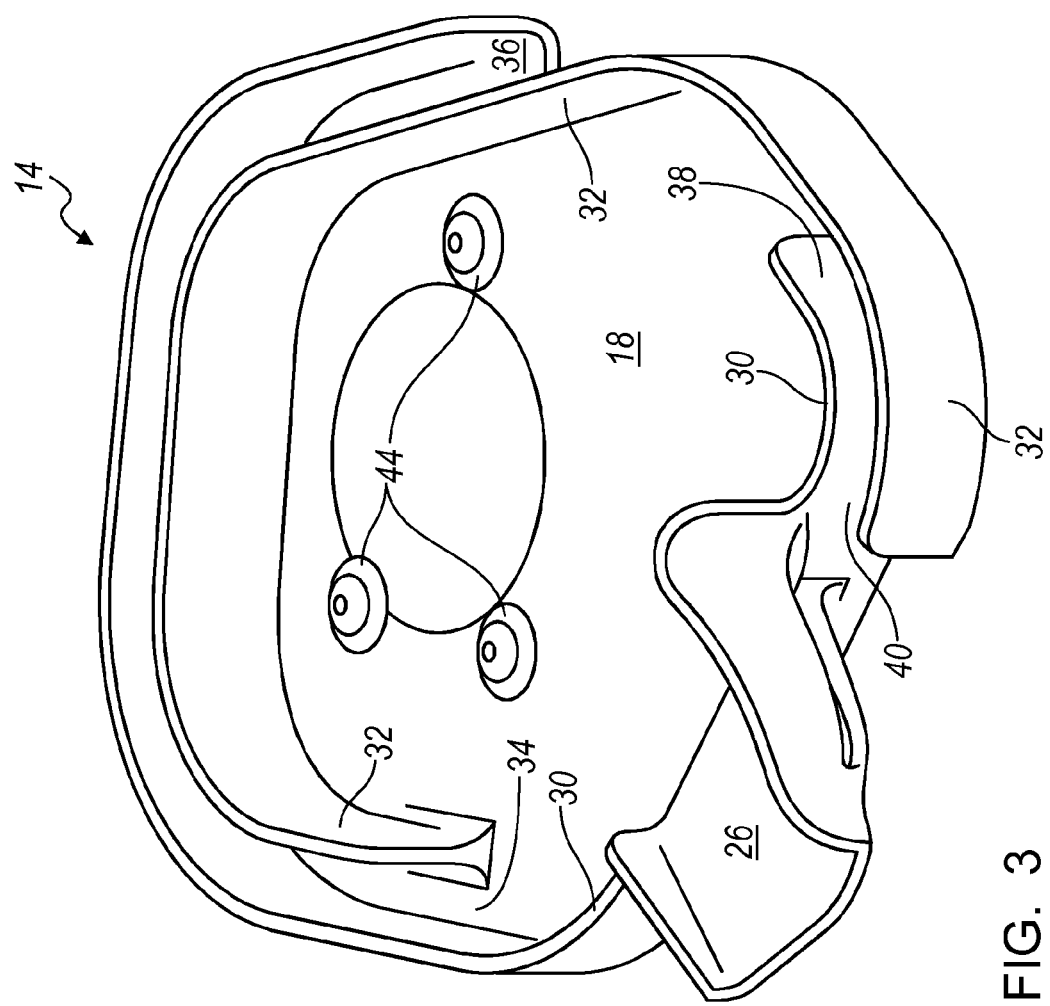
FIG. 3 is top perspective view of the fuel retention component.

The retention component 14, which is seen best in FIGS. 2 and 3, includes a first wall 30, which extends upward and substantially perpendicular from the lower surface 18 and along a portion of the perimeter of the lower surface. A second wall 32 extends upward and substantially perpendicular from the lower surface 18 and along a second portion of the perimeter of the lower surface.

The first wall 30 encloses a first portion of the lower surface 18. The second wall 32 encloses a second portion of the lower surface 18. A portion of the second wall 32 is spaced laterally from the first wall 30. A first channel 34, communicating with the enclosed lower surface 18 and formed between the first and second walls 30, 32, terminates at an open end 36, which communicates with the fuel tank 10 (shown in FIG. 1). Similarly, a shorter second channel 38, communicating with the enclosed lower surface 18 and formed between the first and second walls 30, 32, terminates at an open end 40, which communicates with the fuel tank 10.

The heights of the walls 30, 32 can be adjusted depending on the volume of fuel required to be retained around the inlet 42 at the bottom of the fuel pump module 12, which is supported on the lower surface 18 of the internal fluid retention component 14. Presence of fuel at inlet 42 permits the fuel pump module 12 to re-prime itself after the tank 10 is refilled with fuel.

Referring to FIGS. 1-3, during normal operation of the fuel system, fuel in tank 10 enters component 14 through the open channels 34, 38, which extend along the perimeter of component 14. The channels 34, 38 route fuel on the lower surface 18 where the fuel pump module 12 is located. A fuel pump in the module 12 supplies fuel to a fuel induction system (not shown) and to an engine (not shown).

Referring to FIG. 3, the lower surface 18 may be formed with bumps 44, which assist in retaining the desired location of the fuel pump module 12 in the component 14.

The fuel retention component 14 is preferably made of plastic material formed by injection molding, but may be made of other materials and formed in other ways, if so desired.

While certain embodiments of the present invention have been described in detail, those familiar with the art to which this invention relates will recognize various alternative designs and embodiments for practicing the invention as defined by the following claims.

What is claimed is:

1. A fuel system for a vehicle, comprising:
a fuel tank having a bottom surface;
a fuel pump module located within the fuel tank;
a fuel retention component located in the fuel tank, and including a lower surface resting on the bottom surface of the fuel tank, the lower surface supporting the fuel pump module; a first wall extending upward vertically from the lower surface and having a length that extends along at least one-half of a perimeter of the lower surface; a second wall extending upward vertically from the lower surface and having a second length that extends along at least one-half of the perimeter of the lower surface and spaced laterally from the first wall along the entire length of the second wall; a first channel located between portions of the lengths of the first and second walls, with the first wall being spaced farther from the fuel pump module than the second wall along an entire length of the first channel, the first channel having a first end opening to the lower surface and a second end opening to the bottom surface of the fuel tank, the first channel providing a fluid passage through which fuel can flow between the fuel tank and the lower surface; and a second channel, spaced from the first channel, located between portions of the lengths of the first and second walls, with the second wall being spaced further from the fuel pump module than the first wall along an entire length of the second channel, the second channel having a first end opening to the lower surface and a second end opening to the bottom surface of the fuel tank.

2. The fuel system of claim 1, further comprising:
a fill neck through which fuel enters the fuel tank; and
a duct directed from the fill neck toward the lower surface.

3. The fuel system of claim 1, wherein a ramp is inclined downward toward the lower surface and is at least partially supported on one of the first and second walls.

\* \* \* \* \*